United States Patent [19]

Nagaoka et al.

[11] 4,199,779
[45] Apr. 22, 1980

[54] VIR-SIGNAL PROCESSING CIRCUITRY FOR VIDEO TAPE RECORDER

[75] Inventors: Yoshitomi Nagaoka, Neyagawa; Masaaki Kobayashi, Kawanishi, both of Japan

[73] Assignee: Matsushita Electric Industrial Co., Ltd., Kadoma, Japan

[21] Appl. No.: 949,552

[22] Filed: Oct. 4, 1978

[30] Foreign Application Priority Data

Oct. 12, 1977 [JP] Japan .................................. 52-122651
Oct. 14, 1977 [JP] Japan .................................. 52-123764

[51] Int. Cl.$^2$ ........................... H04N 5/79; H04N 5/78
[52] U.S. Cl. ............................................ 358/8; 358/4; 360/37
[58] Field of Search ................. 358/8, 4, 127; 360/33, 360/37

[56] References Cited

U.S. PATENT DOCUMENTS

| Re. 29,975 | 4/1979 | Ishigaki et al. | 358/8 |
|---|---|---|---|
| 3,918,085 | 11/1975 | Numakura et al. | 358/8 |
| 3,996,610 | 12/1976 | Kawamoto | 358/8 |
| 4,007,484 | 2/1977 | Amari | 358/8 |
| 4,010,490 | 3/1977 | Ota | 358/8 |
| 4,134,126 | 1/1979 | Hirai | 358/8 |

*Primary Examiner*—Daryl W. Cook
*Attorney, Agent, or Firm*—Wenderoth, Lind & Ponack

[57] ABSTRACT

A VIR-signal processing circuitry for a VTR (video tape recorder) having a comb filter for obtaining a correct operation of the VIR circuit incorporated in a television receivers, comprises a comb filter stopping means for preventing the VITS (vertical interval test signal) on the 18th line from polluting the VIRS (vertical interval reference signal), a phase transfer means for transferring the phase information of the transmitted VIRS to the reference subcarrier after elimination of the crosstalks by integrating the VIRS, an amplitude transfer means for transferring the amplitude information of the transmitted VIRS to the output signal of said phase transfer means after elimination of the crosstalks by integrating the VIRS, and a VIRS replacing means for replacing the transmitted VIRS by the newly developed chrominance reference using the output signal of said amplitude transfer means.

6 Claims, 4 Drawing Figures

VIR-SIGNAL PROCESSING CIRCUITRY FOR VIDEO TAPE RECORDER

BACKGROUND OF THE INVENTION

1. Field of the Invention

The present invention relates to a VIR-signal processing circuit for a video tape recorder of azimuth recording type.

2. Description of the Prior Art

VIR-signal, which was developed to correct distortions during transmission, is recently utilized in color television receivers. These receivers suffer from control errors of tint and saturation if the VIR-signal is supplied through a VTR of azimuth recording type.

Control errors result from pollution of the chrominance reference of the VIR-signal by the chrominance component of VITS placed on the 18th line due to the comb filter which is incorporated in the VTR to eliminate crosstalks from adjacent recorded tracks. Although interruption of the comb filter on the 19th line prevents VITS on the 18th line from polluting the chrominance reference, there remains a possibility of disturbances from crosstalks. No methods have yet been proposed which eliminate the disturbances from crosstalks.

SUMMARY OF THE INVENTION

It is an object of the present invention to provide a signal processing circuit for eliminating the crosstalk components encountered in a VTR of azimuth recording type.

It is another object of the present invention to provide a signal processing circuit which can improve the color fidelity of the reproduced picture from the VTR through use of the VIR-signal.

To achieve the foregoing objects, a VIR-siganl processing circuitry for a VTR having a comb filter for obtaining a correct operation of the VIR circuit incorporated in a television receiver comprises a comb filter stopping means for preventing the VITS on the 18th line from polluting the VIRS, a phase transfer means for transferring the phase information of the transmitted VIRS to the reference subcarrier after elimination of the crosstalk component by integrating the VIRS, an amplitude transfer means for transferring the amplitude information of the transmitted VIRS to the output signal of said phase transfer means after elimination of the crosstalk component by integrating the VIRS, and a VIRS replacing means for replacing the transmitted VIRS by the newly developed chrominance reference using the output signal of said amplitude transfer means.

DESCRIPTION OF DRAWINGS

These and other features of the invention will be apparent from the following description of the invention taken in connection with the accompanying drawings, in which.

DESCRIPTION OF PREFERRED EMBODIMENTS

Figure 1:
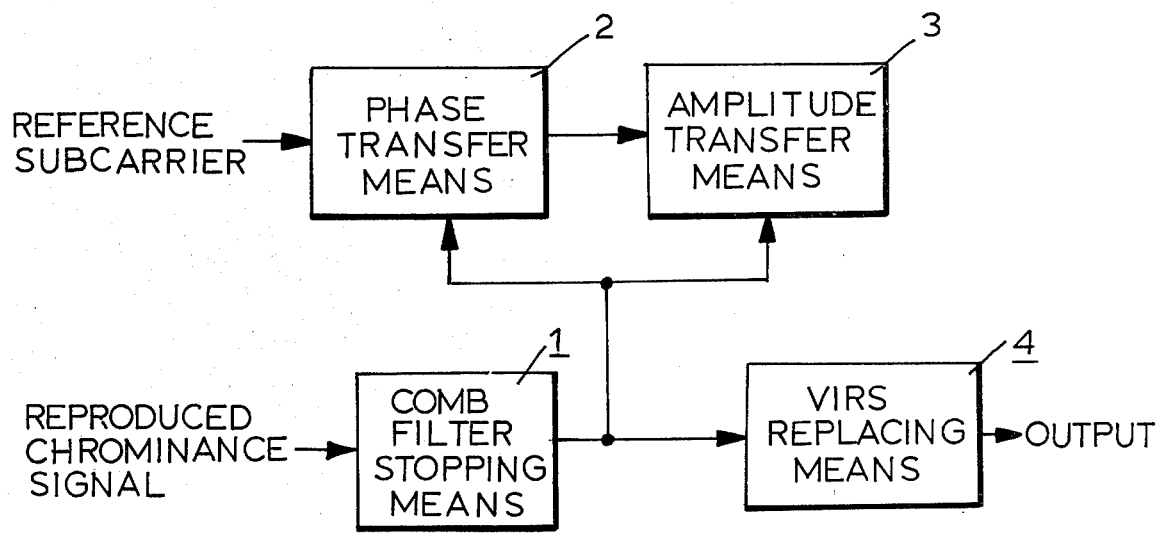
FIG. 1 is a block diagram of an embodiment according to the present invention.

In a home VTR, a luminance signal and a carrier chrominance signal are recorded simultaneously on a magnetic tape using the frequency domain multiplexing technique. The luminance signal, which is frequency modulated on a carrier of 3 MHz, occupies the higher frequency portion, and the carrier chrominance signal, which is down-converted to a carrier of 629 kHz, fills up the lower frequency portion. The thus frequency-multiplexed signal is recorded on tracks by using two video heads one after another. One of the two heads is responsible to record the television signal during one television field on a track, and the other records the next field's signal on the neighboring track. In order to increase the recording density, the two heads are slightly inclined relative to each other in the VTR of azimuth recording type. As the track recorded by a specific head is made to be traced by the same head in playback mode, the crosstalked signal from adjacent tracks, which is recorded by the other head, is reduced due to the so-called azimuth-loss. The high recording-density with no guardband is thus accomplished.

The amount of azimuth-loss depends on the wavelength of the recorded signal which corresponds inversely to the frequency of the signal. As the wavelength of the recorded luminance signal is very short (approximately 1.5 $\mu$m), the reduction of the crosstalk is satisfactory. On the other hand, the chrominance signal whose wavelength is rather long (9 $\mu$m) receives less azimuth-loss and the residual crosstalk component appears. This residual crosstalk components are elaborately cancelled utilizing the phase rotation method, which makes the spectrum of crosstalks to interleave that of the desired signal, and also utilizing the comb filter. Because this combination of the phase rotation and the comb filter relies on the close correlation of the picture signal, no reduction of the crosstalk is attained in the case of non-correlated signals such as the VITS or the VIRS. On the contrary, the chrominance reference of the VIRS is polluted by the chrominance components of the VITS placed on the 18th line due to the comb filter. These crosstalks and the pollution from the 18th line disturbs the operation of the VIR circuit of the receiver. Although the interruption the comb filtering on the 19th line prevents VITS on the 18th line from polluting the chrominance reference, there remains a possibility of disturbances from crosstalks. No methods have yet been proposed which eliminate the disturbances from crosstalks.

It has become apparent from the investigation by the inventors that the crosstalk component can actually be eliminated owing to the phenomenon called "phase scattering effect of crosstalks" which means that the crosstalk components can be eliminated by integrating the VIR-signal, which includes the crosstalk components, because the phase relationship between the chrominance reference and the crosstalk components is altered almost randomly in every television field. Followings are more detailed explanations of the new phenomenon.

A tape pattern on a recorded tape consists of several tracks. TV signals during one field time is recorded on a track. The carrier chrominance signal is down-converted into a carrier of 629 kHz. Suppose that a sinusoidal wave of 629 kHz is recorded on each track. Then if there are no velocity errors in head rotation or tape running, the phase relationship of the sinusoidal wave between adjacent tracks is considered to become specific relation. The practical recording machines, however, have more or less velocity errors called "jitter" which makes the phase relation to alter every moment. The measurement shows that the jitter consists of several frequency components. These multiple frequency components alter the phase relation almost randomly every moment.

In playback mode, a video head picks up signals across two or three adjacent tracks depending upon accuracy of tracing to recorded tracks. A signal from main track is the desired signal and signals from adjacent tracks are the crosstalk components. As the phase relation among recorded signals on adjacent tracks is altered by the jitter from point to point of main track, the phase relation between the desired signal and the crosstalk component is also randomly changed. If the amount of the jitter is large enough for the maximum phase difference to exceed 360°, the crosstalk components can be reduced due to the integration of the VIR-signal. Measurements and calculations show that the maximum phase difference goes far beyond 360°.

The present invention places its basis on the above mentioned principle.

Turning now to FIG. 1, there is shown a block diagram of an embodiment according to the present invention. A comb filter stopping means receives the reproduced chrominance signal from the conventional circuitry of the VTR and interrupts the comb filtering on the 19th line in order to prevent the VITS on the 18th line from polluting the VIRS. The output signal of the comb filter stopping means is fed to a phase transfer means, an amplitude transfer means and the VIRS replacing means. Having received a reference subcarrier and said output signal of said comb filter stopping means, said phase transfer means extracts a desired phase information of the VIRS after elimination of the crosstalk component by an effect of an integrator incorporated in said phase transfer means in accordance with the aforesaid principle of the present invention, and transfers said desired phase information of the VIRS on said reference subcarrier. The output signal of said phase transfer means, which is a reference subcarrier whose phase is trimmed by the phase information of the VIRS, is applied to said amplitude transfer means. Said amplitude transfer means extracts the desired amplitude information of the VIRS after elimination of the crosstalk component by an effect of an integrator incorporated in said amplitude transfer means in accordance with the principle of the present invention, and transfers said desired amplitude information of the VIRS on said phase-trimmed reference subcarrier. The output subcarrier of said amplitude transfer means conveys both the phase and amplitude information of the VIRS. Said VIRS replacing means gates the output signal of said amplitude transfer means to meet a requirement for the waveform of the chrominance reference of the VIRS, and inserts said newly formed chrominance reference of the VIRS on the 19th line after deletion of the original chrominance reference of the VIRS. Having the pure chrominance reference of the VIRS without any disturbances of the crosstalks, the output siganl of said VIRS replacing means assures a correct operation of the VIR circuit in a television receiver.

Figure 2:
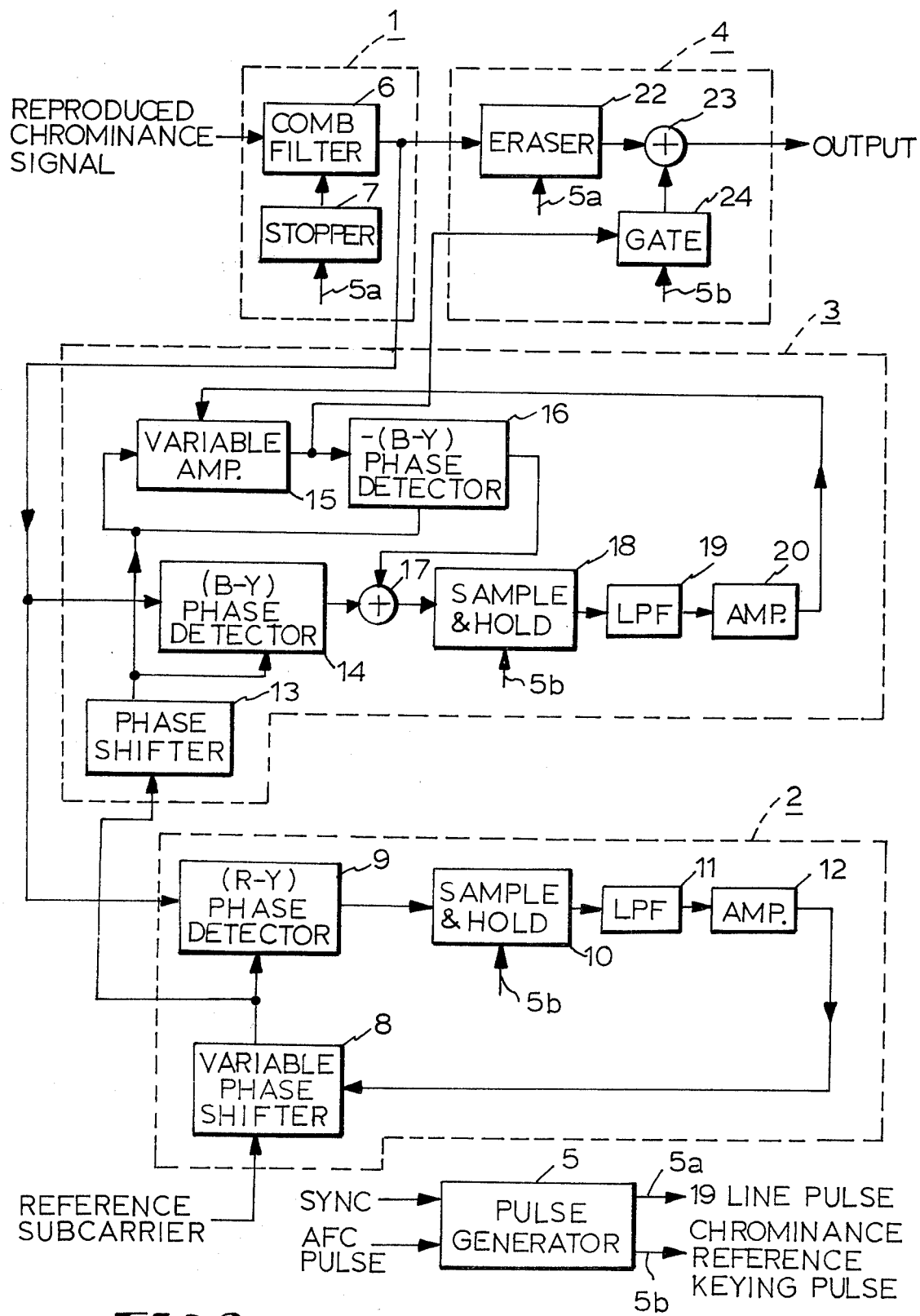
FIG. 2 is a more detailed block diagram of an embodiment according to the present invention.

FIG. 2 shows a more detailed block diagram of an embodiment according to the present invention. Blocks enclosed by dotted lines correspond to the blocks of FIG. 1 which are designated by the same reference numerals.

The pulse generater 5 produces the 19 line pulse and the chrominance reference keying pulse on the output terminals 5a and 5b, respectively, utilizing the sync and the AFC pulse supplied from the conventional circuitry of the VTR. For making the explanation simple, FIG. 1 does not include the pulse generater whose configuration can be easily found, for example, in the article entitled "GE's Broadcast-Controlled Color System Part I" appearing on Electronic Technician/Dealer, August, 1976.

Said comb filter stopping means 1 consists of the comb filter 6 and the stopper 7. Said stopper 7 interrupts the operation of said comb filter 6 on the 19th line in response to said 19 line pulse.

Said phase transfer means 2 comprises the variable phase shifter 8, the (R-Y) phase detector 9, the sample and hold circuit 10, the lowpass filter 11 and the amplifier 12. The reference subcarrier is applied to said variable phase shifter 8, which changes the phase of said reference subcarrier in response to the output signal of said amplifier 12. Said (R-Y) phase detector demodulates the output signal of said comb filter 6 with the aid of said reference subcarrier supplied from said variable phase shifter. Said sample and hold circuit 10 extracts the crominance reference of the VIRS unilizing said chrominance reference keying pulse applied through the terminal 5b. The extracted chrominance reference by said sample and hold circuit 10 includes the desired phase information of the transmitted VIRS and the crosstalk components. Said lowpass filter 11, which has an enough time-constant to eliminate the crosstalks according to the principle of the present invention, transmits said desired phase information of the VIRS after elimination of the crosstalk components. The output signal of said lowpass filter 11 is amplified by said amplifier 12 and fed to said variable phase shifter 8 to form a negative feedback loop. This feedback loop controls the phase of said reference subcarrier to be perpendicular to the phase of the chrominance reference of the VIRS. This phase of the chrominance reference has no disturbances from the crosstalks because said lowpass filter 11 integrates the VIRS for long interval enough to eliminate the crosstalks. As a result, said phase transfer means 2 transfers the phase information of the VIRS on the reference subcarrier appearing on the output terminal of said variable phase shifter.

Said amplitude transfer means is the negative feedback loop composed of the variable amplifier 15, the -(B-Y) phase detector 16, the adder 17 the sample and hold circuit 18, the lowpass filter 19 and the amplifier 20. The output signal of said variable phase shifter 8 is applied to said variable amplifier 15 and said -(B-Y) phase detector 16 through the phase shifter 13 whose effect will be shown later. Said -(B-Y) phase detector demodulates the output signal of said variable amplifier 15 with the aid of the reference subcarrier supplied through said phase shifter 13. The output signal, which is proportional to the amplitude of the output of said variable amplifier, is applied to said adder 17. On the other input terminal of said adder 17, the output signal of the (B-Y) phase detector 14 is applied. Said (B-Y) phase detector demodulates the output signal of said comb filter 6 with the aid of the reference subcarrier supplied from said phase shifter 13. Said phase shifter 13 changes the pulse of the reference subcarrier by 90 degree so that the phase of the reference subcarrier supplied from said phase shifter 13 coincides with that of the chrominance reference of the VIRS. As the output signals of said phase detectors 14 and 16 have opposite polarities with each other, the sum of both signals by said adder 17 becomes almost zero. Said negative feedback loop, composed of said sample and hold circuit 18, said lowpass filter 19, said amplifier 20, said variable amplifier 15 and said -(B-Y) phase detector 16, controls the amplitude of the reference subcarrier applied to said variable amplifier 15 in similar manner as the loop in the phase transfer means 2, so as to make the output signal of said adder 17 zero. As said lowpass filter 19 plays the same role as said lowpass filter 11, the desired amplitude information of the chrominance reference of the VIRS is transferred to the amplitude of the reference subcarrier appearing on the output terminal of said variable amplifier 15 without the disturbance of the crosstalks.

The gate 21, the eraser 22 and the adder 23 constitute said VIRS replacing means 4. Said gate 21 forms a new chrominance reference by gating the output reference subcarrier of said variable amplifier 15 with the aid of said chrominance reference keying pulse. Said eraser 22 deletes the signal on the 19 th line using said 19 line pulse. Said adder 23 inserts the output signal of said gate 21 on the 19th line. The output signal of said adder 23 is a desired chrominance signal in which the chrominance reference of the VIRS conveys the accurate phase and amplitude informations of the transmitted VIRS.

The negative feedback loop in FIG. 2 is similar to that of the VIR circuit incorporated in television receivers. The purpose of the embodiment of FIG. 2 is in the most precise elimination of the crosstalk component, because the time-constant of said lowpass filters 11 and 19 can be separately determined from the design of the television receiver, and can be made very long with no difficulty. The practical VIR circuit of the receiver has time-constant of 0.5 to 1 sec. These values are almost satisfactory from the view point of practical applications, as only slight loss of crosstalk reduction is encountered.

Figure 3:
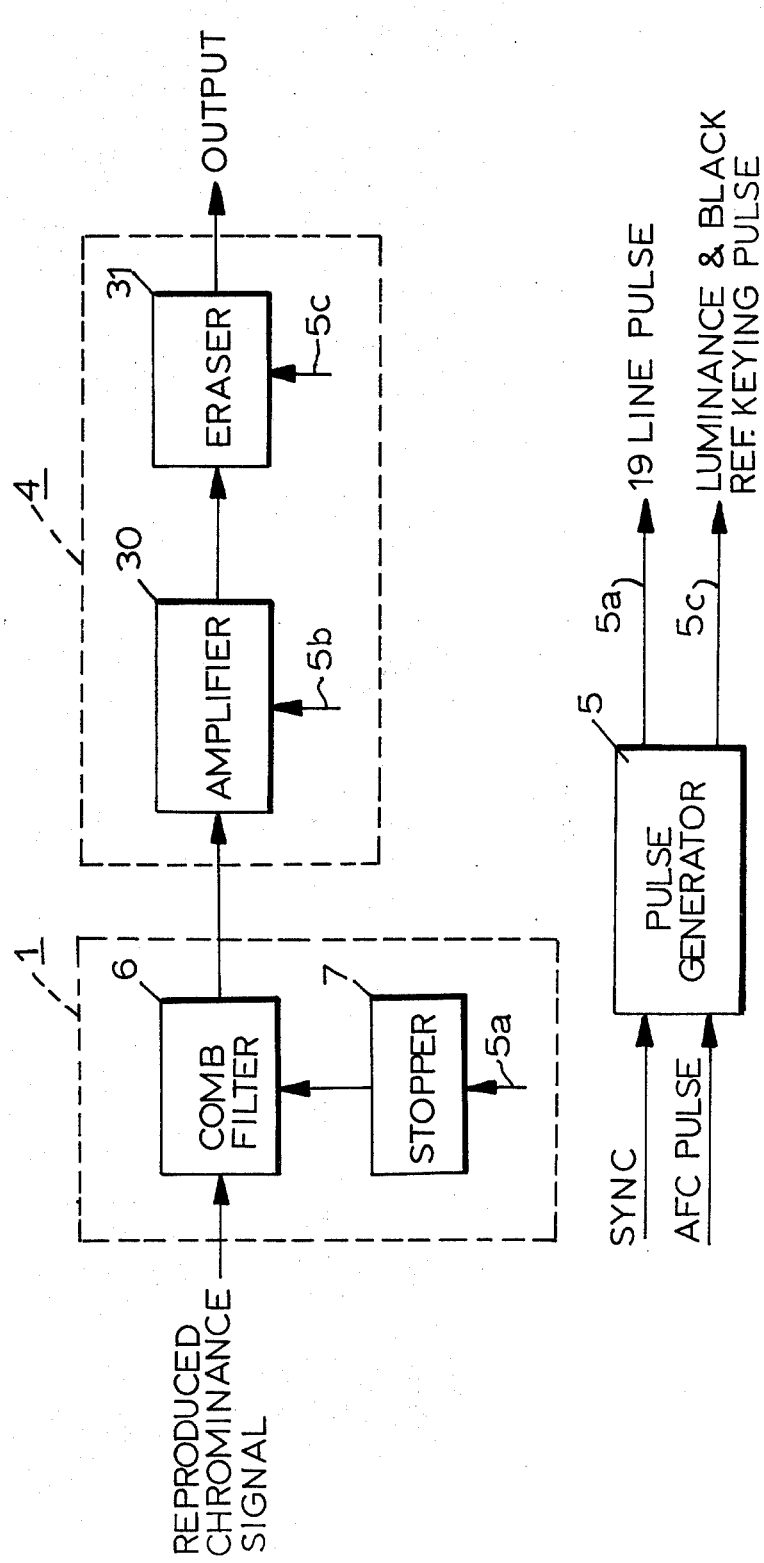
FIG. 3 is a block diagram of another embodiment according to the present invention.

In FIG. 3, there is shown a block diagram of another embodiment according to the present invention, in which the elimination of the crosstalks is made by the lowpass filter in the VIR circuit of the receiver. The blocks which have the same operations as those of FIG. 2 are designated by the same reference numerals.

The pulse generator 5 produces the luminance and black reference keying pulse on the output lead 5c as well as the 19 line pulse. The reproduced chrominance signal is applied to the amplifier 30 after elimination of the disturbances from the VITS on the 18th line by said comb filter stopping means 1. As the interruption of said comb filter 6 generally produces the amplitude loss of the chrominance reference of the VIRS, said amplifier 30 produces excess amplification, which is enough to compensate said loss of amplitude, during the 19th line in response to the 19 line pulse. The output signal of said amplifier 30 is fed to the eraser 31 which deletes the noise or the crosstalk appearing on the latter half of the 19th line on which the luminance and the black reference of the VIRS are placed. As no chrominance components are inserted on the latter half of the 19th line in the broadcast stations, it is quite reasonable to delete the noise on that portion. This deletion is effective on some configurations of the VIR circuit which is described in the article entitled "GE's Broadcast-Controlled Color System, Part 2" appearing on Electronic Technician/- Dealer, September, 1976. The VIR circuit described in above article controls tint and saturation utilizing both the chrominance reference and the black reference of the VIRS. Therefore, the VIR circuit should have ability for crosstalk elimination twice than that of a VIR circuit which uses only the chrominance reference for control of tint and saturation. The deletion on the latter half of the 19th line saves the excess elimination of the crosstalks.

Figure 4:
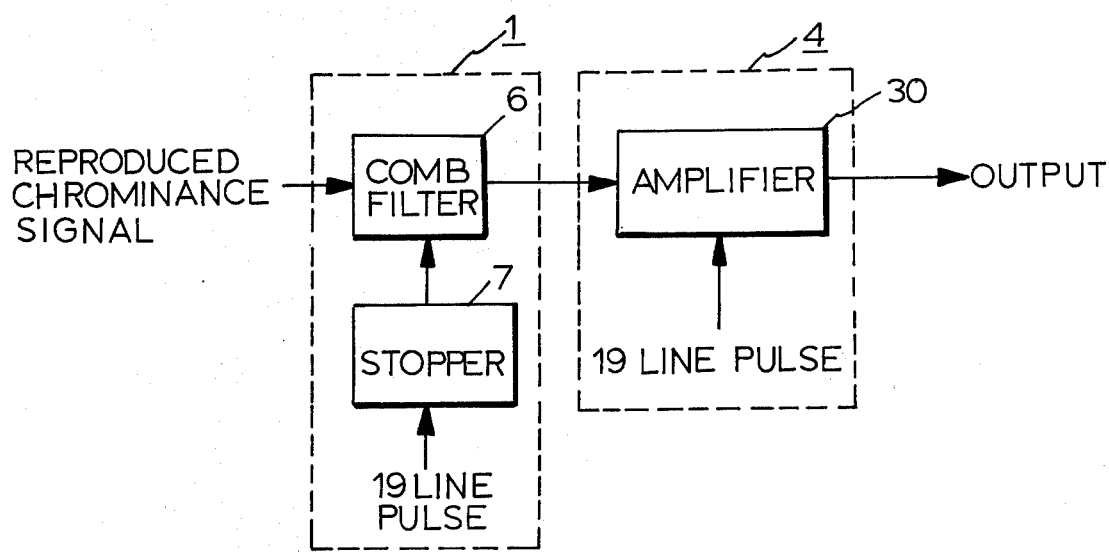
FIG. 4 is a block diagram of a further embodiment according to the present invention.

FIG. 4 shows a most simple embodiment according to the present invention. The circuitry is almost the same as that of FIG. 3 except that the eraser 31 is not used. The embodiment of FIG. 4 relies on the lowpass filters of VIR circuit of receivers for elimination of the crosstalks. Although the accuracy of VIRS correction is slightly degraded as compared with the embodiment of FIG. 3, the embodiment of FIG. 4 has an advantage of simplicity.

In the foregoing description, it is assumed that the VIRS is placed on the 19th line according to the FCC's rule. It is obvious, however, that the application of the present invention is not limited in the United States.

It is intended that all matters contained in the foregoing descriptions and in the drawings shall be interpreted as illustrative only, not as limitative, of the invention.

What is claimed is:

1. A VIR-signal processing circuitry for a VTR having a comb filter, for obtaining a correct operation of the VIR circuit incorporated in a television receiver, comprising:
   a comb filter stopping means which receives the reproduced chrominance signal, and interrupts the comb filtering on the line on which VIRS is placed;
   a phase transfer means which receives the output signal of said comb filter stopping means and the reference subcarrier, and transfers the phase information of the VIRS to said reference subcarrier after elimination of crosstalk components by integration of the VIRS;
   an amplitude transfer means which receives the output signal of said comb filter and the output signal of said phase transfer means, and transfers the amplitude information of the VIRS to said output signal of said phase transfer means after elimination of crosstalk components by integration of the VIRS; and
   a VIRS replacing means which (a) receives the output signal of said comb filter stopping means and the output signal of said amplitude transfer means, and (b) deletes said output signal of said comb filter stopping means on the line on which VIRS is placed, and (c) forms the new chrominance reference by gating said output signal of said amplitude transfer means, and (d) inserts said new chrominance reference on said output signal of said comb filter stopping means whose signal on the line on which VIRS is placed is deleted.

2. A VIR-signal processing circuitry for a VTR according to claim 1, wherein said phase transfer means comprises:
   a variable phase shifter which receives the reference subcarrier and changes the phase of said reference subcarrier;
   an (R-Y) phase detector which receives the output signal of said comb filter stopping means and the output signal of said variable phase shifter, and demodulates said output signal of said (R-Y) phase detector;

a sample and hold circuit which receives the output signal of said (R-Y) phase detector and extracts the chrominance reference of the VIRS;

a lowpass filter which receives the output signal of said sample and hold circuit and integrates said output signal of said sample and hold circuit for elimination of the crosstalks; and optionally an amplifier which amplifies the output signal of said lowpass filter and feeds the amplified output signal to said variable phase shifter for making a negative feedback loop.

3. A VIR-signal processing circuitry for VTR according to claim 1, wherein said amplitude transfer means comprises:

a phase shifter which receives the reference subcarrier from said phase transfer means and changes the phase of said reference subcarrier if necessary;

a B-Y phase detector which receives the output reference subcarrier of said phase shifter and the output signal of said comb filter stopping means, and demodulates said output signal of said comb filter stopping means;

a variable amplifier which receives the output reference signal of said phase shifter and a control signal, and changes the amplitude of said reference signal in response to said control signal;

a -(B-Y) phase detector which receives the output signal of said variable amplifier and the output signal of said phase shifter and extracts the envelope of said output signal of said variable amplifier;

an adder which sums up the two output signals of said (B-Y) phase detector and said -(B-Y) phase detector;

a sample and hold circuit which receives the output signal of said adder and extracts the chrominance reference of the VIRS;

a lowpass filter which receives the output signal of said sample and hold circuit and integrates said output signal of said sample and hold circuit for elimination of the crosstalks; and an amplifier which amplifies the output signal of said lowpass filter if necessary, and feeds the amplified output signal to said variable amplifier as said control signal for making a negative feedback loop.

4. A VIR-signal processing circuitry for a VTR having a comb filter, for obtaining a correct operation of the VIR circuit incorporated in a television receiver, comprising:

a comb filter stopping means which receives the reproduced chrominance signal and interrupts the comb filtering on the line on which VIRS is placed; and a VIRS replacing means which receives the output signal of said comb filter stopping means and recovers the desired waveform of the chrominance reference.

5. A VIR-signal processing circuitry for a VTR according to claim 4, wherein said VIRS replacing means comprises:

an amplifier which receives the output signal of said comb filter stopping means and recovers a loss of the amplitude of the chrominance reference caused by interruption of the comb filter; and an eraser which receives the output signal of said amplifier and deletes the signals or noise on the latter half of the line on which the luminance and black references of the VIRS are placed.

6. A VIR-signal processing circuitry for a VTR according to claim 4, wherein said VIRS replacing means comprises an amplifier which receives the output signal of said comb filter stopping means and recovers a loss of the amplitude of the chrominance reference caused by interruption of the comb filter.

* * * * *